US008755748B2

United States Patent
Li et al.

(10) Patent No.: US 8,755,748 B2
(45) Date of Patent: Jun. 17, 2014

(54) WIRELESS TELEPHONE SYSTEM WITH HEADSET-HANDSET ASSEMBLY

(71) Applicant: Skymotion Technology Limited, Tortola (VG)

(72) Inventors: Man To Li, N.T. (HK); Wai Keung Cheung, N.T. (HK); Ho Hing Ng, N.T. (HK)

(73) Assignee: Skymotion Technology Limited, Tortola (VG)

( * ) Notice: Subject to any disclaimer, the term of this patent is extended or adjusted under 35 U.S.C. 154(b) by 0 days.

(21) Appl. No.: 13/628,057

(22) Filed: Sep. 27, 2012

(65) Prior Publication Data

US 2013/0084895 A1 Apr. 4, 2013

(30) Foreign Application Priority Data

Sep. 29, 2011 (CN) .......................... 2011 2 0377940

(51) Int. Cl.
*H04B 7/00* (2006.01)
*H04W 4/00* (2009.01)
*H04M 1/00* (2006.01)
*H04B 1/38* (2006.01)
*H04B 1/40* (2006.01)

(52) U.S. Cl.
USPC ... 455/41.2; 455/74.1; 455/426.1; 455/556.1; 455/569.1; 455/573; 455/575.2; 379/428.02

(58) Field of Classification Search
USPC .............. 455/74.1, 426.1, 569.1, 575.2, 41.2, 455/573, 556.1; 379/428.02, 441, 428.2; 370/310

See application file for complete search history.

(56) References Cited

U.S. PATENT DOCUMENTS

| 2005/0197061 | A1* | 9/2005 | Hundal | .......................... 455/41.2 |
| 2007/0243909 | A1* | 10/2007 | Huang | ......................... 455/569.1 |
| 2008/0080703 | A1* | 4/2008 | Penning et al. | ........... 379/428.02 |
| 2008/0108306 | A1* | 5/2008 | Yee | ................................ 455/41.2 |

* cited by examiner

*Primary Examiner* — Inder Mehra
(74) *Attorney, Agent, or Firm* — Prakash Nama; Global IP Services, PLLC

(57) ABSTRACT

A wireless telephone system with headset-handset assembly which comprises a base station connected to a public telephone network and/or an internet; one or more than one wireless headset-handset assembly movably connected with the base station, and each of the wireless headset-handset assembly comprises a headset and a handset hand-held receiver movably connected with each other; the headset and the base station are connected wirelessly in order to receive signals and data from the base station and transmit signals and data to the base station to achieve wireless communication; the headset is provided with a headset signal transmission end; the handset hand-held receiver comprises a handset signal transmission end to receive signals and data from the headset and transmit signals and data to the headset, and the handset signal transmission end is electronically connected with the headset signal transmission end when it is connected with the headset.

10 Claims, 3 Drawing Sheets

WIRELESS TELEPHONE SYSTEM WITH HEADSET-HANDSET ASSEMBLY

BACKGROUND OF THE INVENTION

The present invention relates to kind of wireless telephone system and more specifically relates to a kind of wireless telephone system which comprises one or more than one headset-handset assembly.

A wireless telephone system currently available in the market comprises a base station and one or more than one wireless handset. The base station connects with a public telephone network. Each wireless handset connects with the base station wirelessly.

In general, the base station is provided with a base station recess to accommodate the wireless handset for recharging the wireless handset. A base station control circuit comprises a base station center control unit and a base station digital enhanced cordless telecommunication (DECT) unit. The base station DECT unit connects with the base station center control unit and accomplishes wireless data transmission to the handset and wireless data reception by the handset.

A handset control circuit of each wireless handset comprises a handset center control unit, a handset amplifier unit that connects with the handset center control unit, a handset sound reception unit that connects with the handset center control unit, and a handset DECT unit. The handset DECT unit connects with the handset center control unit and accomplishes wireless data transmission to the base station and wireless data reception by the base station. The handset is also provided with a handset operation unit that connects with the handset center control unit. The handset operation unit connects with handset operation buttons such as call receiving button and call ending button etc.

When a user receives a phone call, the user picks up the handset from the base station recess and establishes a phone call with a caller by pressing the handset operation buttons to control the base station center control unit using DECT wireless communication technology. The base station DECT unit transfers caller's data processed by the base station center control unit to the handset DECT unit wirelessly. The caller's data is then released through the handset amplifier unit after being processed by the handset center control unit. On the other hand, user's data is received by the handset sound reception unit and then transferred to the base station DECT unit by the handset DECT unit after being processed by the handset center control unit. The user's data is transmitted to the caller via a public telephone network after being processed by the base station center control unit. Wireless communication between the base station and the handset is established by repeated execution of the above procedures.

In many occasions, in order that the user can answer a phone call anywhere in a house, the handset may not be rested in the base station recess. In general, a handset rechargeable power source supplies electricity to the handset. The handset rechargeable power source connects with the handset control circuit. When the handset is rested in the base station recess, the base station can recharge the handset rechargeable power source. To achieve this purpose, the handset is provided with a handset power supply transmission end which connects with the handset control circuit. The handset power supply transmission end may adopt a form of, for example, a metal contact piece. The base station control circuit is provided with a base station recharge circuit. The base station recess is provided with a base station power supply transmission end which connects with the base station recharge circuit. The base station power supply transmission end may adopt a form of, for example, a metal contact piece. When the handset is rested in the base station recess, the base station power supply transmission end which adopts a form of a metal contact piece contacts with the handset power supply transmission end which adopts a form of a metal piece. The base station recharge circuit transmits charging voltage to the handset power supply transmission end via the base station power supply transmission end which adopts a form a metal piece to recharge the handset rechargeable power source.

In general, the wireless handset is a hand-held receiver. A user of the handset is then required to hold the receiver by hand when receiving phone calls. Sometimes, the user may have to free his hands for other jobs when answering phone calls. In this situation, the user can only hold the receiver between his head and shoulder. However, holding the receiver in this manner constantly for a long period of time will cause muscle strain and affect the user's health. To solve these problems, there are some wireless telephone systems in the market using wireless headsets in lieu of wireless handsets. A wireless headset is the same as the wireless handset in terms of its structure and method of operation except that it is designed to hang directly on an ear of a user. The wireless headset brings much more convenience to the user since the user is no longer required to hold the receiver by hand when answering phone calls. However, there are still some users who are used to using a receiver to answer a phone call. Therefore there are still market demands for using a hand-held receiver as a wireless handset. To satisfy such market demands, there are some wireless telephone systems each providing a handset and a headset at the same time. A handset and a headset according to these telephone systems may function independently and the user may choose to use either one of them to answer a phone call as situation requires. However, in actual practice, since the user will only use either the wireless handset or the wireless headset at one time, wireless communication modules required to be installed in both the wireless handset and wireless headset due to provision of both means will lead to increase in production costs and waste of resources.

BRIEF SUMMARY OF THE INVENTION

In view of the aforesaid disadvantages now present in the prior art, it is an object of the present invention to provide a wireless telephone system with headset-handset assembly. The present invention has a simple structure and low production costs, and it also allows users to choose either a wireless headset or a wireless handset to answer a phone call and thereby bringing convenience to the users.

The above object is attained by the present invention as follows:

A wireless telephone system with headset-handset assembly comprising a base station connected to a public telephone network and/or an internet, and one or more than one wireless headset-handset assembly movably connected with the base station. Each of the wireless headset-handset assembly comprises a headset and a handset hand-held receiver movably connected with each other. The headset and the base station are connected wirelessly in order to receive signals and data from the base station and transmit signals and data to the base station to achieve wireless communication. The headset is provided with a headset signal transmission end. The handset hand-held receiver comprises a handset signal transmission end to receive signals and data from the headset and transmit signals and data to the headset, and the handset signal transmission end is electronically connected with the headset signal transmission end when it is connected with the headset.

The headset is provided with a headset center control unit connected with the headset signal transmission end, a power supply connected with the headset center control unit, a headset amplifier unit connected with the headset center control unit, a headset sound reception unit connected with the headset center control unit, a headset DECT unit connected with the headset center control unit and accomplishes wireless data transmission to the base station and wireless data reception by the base station, and an identification unit connected with the headset center control unit and transmits an identification signal to the headset center control unit based on electronic connection between the headset signal transmission end and the handset signal transmission end.

The handset hand-held receiver is provided with a handset center control unit connected with the handset signal transmission end, a handset power supply connected with the handset center control unit, a handset amplifier unit connected with the handset center control unit, and a handset sound reception unit connected with the handset center control unit.

According to one embodiment of the present invention, the handset power supply is a rechargeable power supply which is connected with a first handset power supply transmission end via a handset recharge circuit. The base station is provided with a base station recharge circuit which is connected with a base station power supply and a base station power supply transmission end. The base station power supply transmission end is connected electronically with the first handset power supply transmission end when the handset hand-held receiver is connected with the base station. The power supply of the headset is also a rechargeable power supply which is connected with a headset power supply transmission end via a headset recharge circuit. The handset recharge circuit is also connected with a second handset power supply transmission end. The second handset power supply transmission end is connected electronically with the headset power supply transmission end when the handset hand-held receiver is connected with the headset.

In one embodiment of the present invention, the headset signal transmission end and the handset signal transmission end are PCM interfaces.

The handset hand-held receiver is provided with a headset recess to accommodate the headset. The base station is provided with a handset recess to accommodate the handset hand-held receiver.

The headset is provided with a headset operation key. The headset operation key is connected with a headset operation circuit. The headset operation circuit is connected with the headset center control unit.

The present invention is operated as follows:

In an initial condition, the handset hand-held receiver is rested in the handset recess, the base station power supply transmission end is connected with the first handset power supply transmission end, and the base station recharge circuit transmits charging voltage to the first handset power supply transmission end via the base station power supply transmission end in order to recharge the power supply of the handset via the handset recharge circuit. Meanwhile, the headset is rested in the headset recess, the second handset power supply transmission end is connected with the headset power supply transmission end, and the handset recharge circuit transmits charging voltage to the headset power supply transmission end via the second handset power supply transmission end in order to recharge the power supply of the headset via the headset recharge circuit.

When a call comes in, the user is simply required to put the headset into the headset recess if the user wishes to answer the call by using the handset hand-held receiver, whereupon the identification unit of the headset will identify the electronic connection between the headset signal transmission end and the handset signal transmission end and thus transmit an identification signal to the headset center control unit to control the headset center control unit to disconnect with the headset amplifier unit and the headset sound reception unit and to activate its connection with the headset signal transmission end. After the user has pressed the headset operation key to answer the call and operation signals are then transmitted to the headset center control unit, a phone communication with the caller is established by controlling the base station using DECT wireless communication technology. A base station DECT unit transmits caller's data to the headset DECT unit wirelessly. The caller's data is then transmitted to the headset signal transmission end via the headset signal transmission end after being processed by the headset center control unit, and it is then being processed again by the handset center control unit and after that released through the handset amplifier unit. On the other hand, user's data received by the handset sound reception unit is transmitted to the headset signal transmission end via the handset signal transmission end after being processed by the handset center control unit, and then being processed again by headset center control unit and after that transmitted to the base station DECT unit by the headset DECT unit. The user's data is transmitted to the caller via the base station by a public telephone network and/or an internet. Wireless communication between the base station and the handset hand-held receiver is established by repeated execution of the above procedures.

When the user wishes to answer the call by using the headset, the user is simply required to pick the headset out of the headset recess and hang it on an ear, whereupon the identification unit of the headset identifies non-electrical connection between the headset signal transmission end and the handset signal transmission end and thus transmits an identification signal to the headset center control unit to control the headset center control unit to connect the headset amplifier unit and the headset sound reception unit and disconnect with the headset signal transmission end. After the user has pressed the headset operation key to answer the call and operation signals are then transmitted to the headset center control unit, a phone communication with the caller is established by controlling the base station using DECT wireless communication technology. The base station DECT unit transmits caller's data to the headset DECT unit wirelessly. The caller's data is then released through the headset amplifier unit after being processed by the headset center control unit. On the other hand, user's data received by the headset sound reception unit is transmitted to the base station DECT unit via the headset DECT unit after being processed by the headset center control unit. The user's data is transmitted to the caller via the base station by a public telephone network and/or an internet. Wireless communication between the base station and the headset is established by repeated execution of the above procedures.

The wireless headset-handset assembly according to the present invention has the advantages of both a headset and a handset hand-held receiver. Users may choose to use either the headset or the handset hand-held receiver according to their different needs. In comparison with prior arts, the wireless headset-handset assembly of the present invention has a lower production cost since it is only required to provide a headset DECT unit at the headset and not required to provide yet another DECT unit at the handset hand-held receiver.

DETAILED DESCRIPTION OF THE INVENTION

The present invention is further described below with reference to but not limited to an embodiment and the accompanying drawings.

Figure 1:
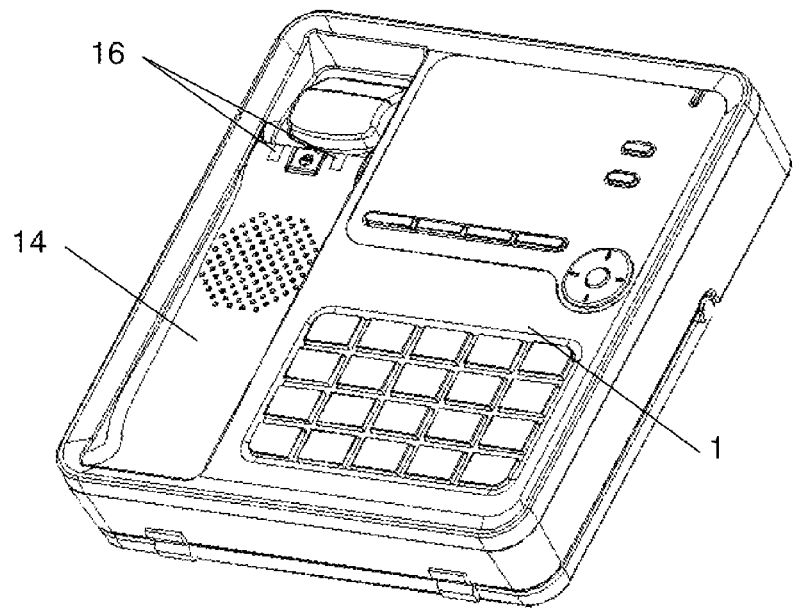
FIG. 1 illustrates a base station of the present invention according to one embodiment.
Figure 2:
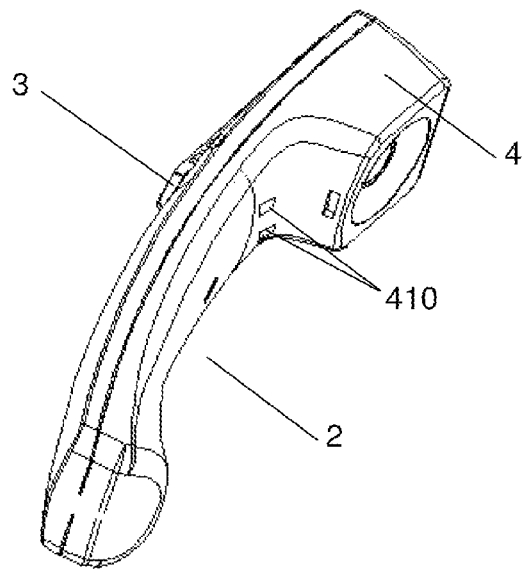
FIG. 2 illustrates a wireless headset-handset assembly of the present invention according to one embodiment.
Figure 3:
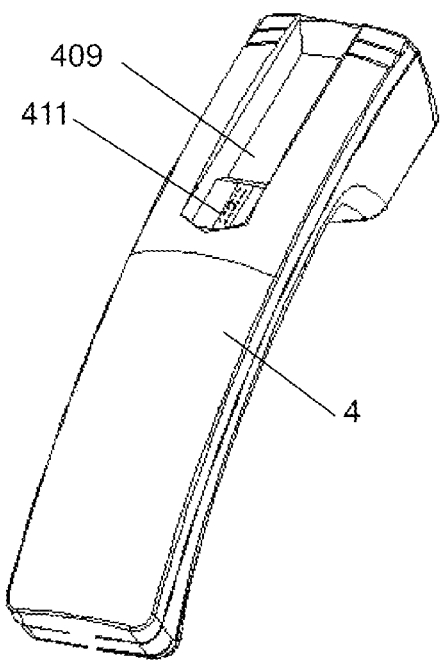
FIG. 3 illustrates a handset hand-held receiver of the present invention according to one embodiment.
Figure 4:
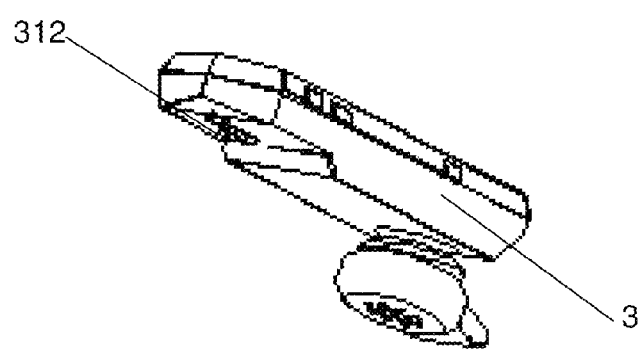
FIG. 4 illustrates a headset of the present invention according to one embodiment.
Figure 5:
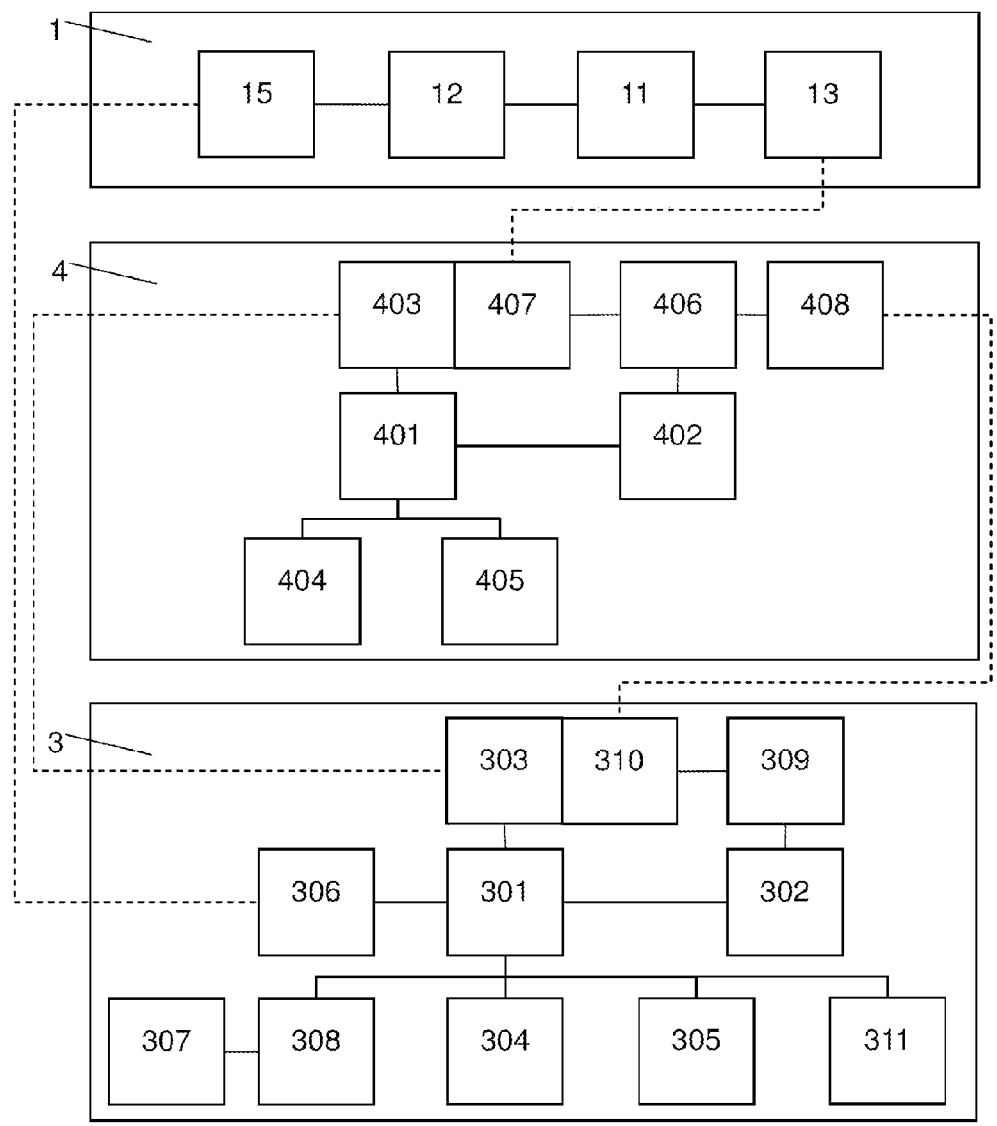
FIG. 5 is a block diagram illustrating a circuit in the present invention according to one embodiment.

FIG. 1 to FIG. 5 illustrate an embodiment of the wireless telephone system with headset-handset assembly according to the present invention. In the present embodiment, the present invention comprises a base station 1 and one or more than one wireless headset-handset assembly 2. The base station 1 connects with a public telephone network and/or an Internet. Each of the wireless headset-handset assembly 2 comprises a headset 3 moveably connected thereto and a handset hand-held receiver 4.

The headset 3 connects with the base station 1 wirelessly for transmitting signals and data to the base station 1 and receiving signals and data from the base station 1 so as to achieve wireless communication. The headset 3 is provided with a headset center control unit 301; a power supply 302 connected with the headset center control unit 301 for supplying electricity thereto; a headset signal transmission end 303 being for example, a pulse code modulation (PCM) interface, connected with the headset center control unit 301 and connected with a metal contact piece 312 exposed outside an outer case of the headset; a headset amplifier unit 304 connected with the headset center control unit 301; a headset sound reception unit 305 connected with the headset center control unit 301; and a headset DECT unit 306 which connects with the headset center control unit 301 and accomplishes wireless data transmission to the base station 1 and wireless data reception by the base station 1. The headset is provided with a headset operation key 307. The headset operation key 307 connects with a headset operation circuit 308. The headset operation circuit 308 connects with the headset center control unit 301. The headset operation key 307 in this embodiment comprises one single button only. To answer a call, press the button once; to end a call, press the button again. In other embodiments, the headset operation key 307 may comprise two buttons, one for answering a call and the other one for ending a call.

The handset hand-held receiver 4 comprises a handset center control unit 401; a power supply 402 connected with the handset center control unit for supplying electricity thereto; a handset signal transmission end 403 being for example, a PCM interface, connected with the handset center control unit 401 and a metal contact piece 411 exposed outside an outer case of the handset, and also electronically connected with the headset signal transmission end 303 when the handset hand-held receiver 4 and the headset 3 are connected in order to receive signals and data from the headset 3 and transmit signals and data to the headset 3; and a handset sound reception unit 404 and a handset amplifier unit 405 connected with the handset center control unit 401 respectively.

The power supply 402 of the handset hand-held receiver 4 in this embodiment is a rechargeable power supply which connects with a first handset power supply transmission end 407 and a second handset power supply transmission end 408 respectively via a handset recharge circuit 406. The first handset power supply transmission end 407 connects with a metal contact piece 410 exposed outside the outer case of the handset. The second handset power supply transmission end 408 connects with the metal contact piece 411 exposed outside the outer case of the handset. The base station 1 is provided with a base station recharge circuit 11 which connects with a base station power supply 12 and a base station power supply transmission end 13. The base station power supply transmission end 13 connects with a metal contact piece 16 exposed outside an outer case of the base station. The base station 1 is provided with a handset recess 14 to accommodate the handset hand-held receiver 4. When the handset hand-held receiver 4 is rested in the handset recess 14, that is to say, when the handset hand-held receiver 4 is connected with the base station 1, the base station power supply transmission end 13 is connected electronically with the first handset power supply transmission end 407. The base station recharge circuit 11 transmits charging voltage to the first handset power supply transmission end 407 via the base station power supply transmission end 13 to recharge the power supply 402 via the handset recharge circuit 406.

The handset hand-held receiver 4 is provided with a headset recess 409 to accommodate the headset 3. The power supply 302 of the headset 3 in this embodiment is a rechargeable power supply which connects with a headset power supply transmission end 310 via a headset recharge circuit 309. When the headset 3 is rested in the headset recess 409, that is to say, when the headset 3 is connected with the handset hand-held receiver 4, the second handset power supply transmission end 408 is electronically connected with the headset power supply transmission end 310. The handset recharge circuit 406 transmits charging voltage to the headset power supply transmission end 310 via the second handset power supply transmission end 408 to recharge the power supply 302 via the headset recharge circuit 309.

The headset center control unit 301 is also connected with an identification unit 311 which transmits an identification signal to the headset center control unit 301 based on electronic connection between the headset signal transmission end 303 and the handset signal transmission end 403 in order to control the headset center control unit 301 to disconnect with the headset amplifier unit 304 and the headset sound reception unit 305 and to activate its connection with the headset signal transmission end 303 when the headset signal transmission end 303 is electronically connected with the handset signal transmission end 403, and to control the headset center control unit 301 to connect with the headset amplifier unit 304 and the headset sound reception unit 305 and to disconnect with the headset signal transmission end 303 when the headset signal transmission end 303 is non-electronically connected with the handset signal transmission end 403.

The present invention is operated as follows:

In an initial condition, the handset hand-held receiver 4 is rested in the handset recess 14, the base station power supply transmission end 13 is connected with the first handset power supply transmission end 407, and the base station recharge circuit 11 transmits charging voltage to the first handset power supply transmission end 407 via the base station power supply transmission end 13 in order to recharge the power supply 402 of the handset via the handset recharge circuit 406. Meanwhile, the headset 3 is rested in the headset recess 409, the second handset power supply transmission end 408 is connected with the headset power supply transmission end 310, and the handset recharge circuit 406 transmits charging voltage to the headset power supply transmission end 310 via the second handset power supply transmission end 408 in order to recharge the power supply 302 of the headset via the headset recharge circuit 309.

When a call comes in, the user is simply required to put the headset 3 into the headset recess 409 if the user wishes to answer the call by using the handset hand-held receiver 4, whereupon the identification unit 311 of the headset will identify the electronic connection between the headset signal transmission end 303 and the handset signal transmission end 403 and thus transmit an identification signal to the headset center control unit 301 to control the headset center control unit 301 to disconnect with the headset amplifier unit 304 and the headset sound reception unit 305 and to activate its connection with the headset signal transmission end 303. After the user has pressed the headset operation key 307 to answer the call and operation signals are then transmitted to the headset center control unit 301, a phone communication with the caller is established by controlling the base station 1 using DECT wireless communication technology. A base station DECT unit 15 transmits caller's data to the headset DECT unit 306 wirelessly. The caller's data is then transmitted to the handset signal transmission end 403 via the headset signal transmission end 303 after being processed by the headset center control unit 301, and it is then being processed again by the handset center control unit 401 and after that released through the handset amplifier unit 405. On the other hand, user's data received by the handset sound reception unit 404 is transmitted to the headset signal transmission end 303 via the handset signal transmission end 403 after being processed by the handset center control unit 401, and then being processed again by headset center control unit 301 and after that transmitted to the base station DECT unit 15 by the headset DECT unit 306. The user's data is transmitted to the caller via the base station 1 by a public telephone network and/or an internet. Wireless communication between the base station 1 and the handset hand-held receiver 4 is established by repeated execution of the above procedures.

When the user wishes to answer the call by using the headset 3, the user is simply required to pick the headset 3 out of the headset recess 409 and hang it on an ear, whereupon the identification unit 311 of the headset 3 identifies non-electronical connection between the headset signal transmission end 303 and the handset signal transmission end 403 and thus transmits an identification signal to the headset center control unit 301 to control the headset center control unit 301 to connect the headset amplifier unit 304 and the headset sound reception unit 305 and disconnect with the headset signal transmission end 303. After the user has pressed the headset operation key 307 to answer the call and operation signals are then transmitted to the headset center control unit 301, a phone communication with the caller is established by controlling the base station 1 using DECT wireless communication technology. The base station DECT unit 15 transmits caller's data to the headset DECT unit 306 wirelessly. The caller's data is then released through the headset amplifier unit 304 after being processed by the headset center control unit 301. On the other hand, user's data received by the headset sound reception unit 305 is transmitted to the base station DECT unit 15 via the headset DECT unit 306 after being processed by the headset center control unit 301. The user's data is transmitted to the caller via the base station 1 by a public telephone network and/or an internet. Wireless communication between the base station 1 and the headset 3 is established by repeated execution of the above procedures.

The above embodiment is a preferred form of the present invention. However, the present invention is not limited by the above embodiment. Any substantive or fundamental changes, modifications, replacements, combinations or simplification within the spirit of the present invention are equivalent alternatives and they are all included in the scope of protection of the present invention.

What is claimed is:

1. A wireless telephone system with headset-handset assembly, characterized in that, it comprises:
    a base station connected to a public telephone network and/or an internet;
    one or more than one wireless headset-handset assembly movably connected with the base station, and each of the wireless headset-handset assembly comprises a headset and a handset hand-held receiver movably connected with each other;
    the headset and the base station are connected wirelessly in order to receive signals and data from the base station and transmit signals and data to the base station to achieve wireless communication; the headset is provided with a headset signal transmission end;
    the handset hand-held receiver comprises a handset signal transmission end to receive signals and data from the headset and transmit signals and data to the headset, and the handset signal transmission end is electronically connected with the headset signal transmission end when it is connected with the headset;
    the handset hand-held receiver could not connect with the base station on its own to provide phone communication without being electronically connected with the headset.

2. The wireless telephone system with headset-handset assembly as in claim 1, characterized in that, the headset is provided with a headset center control unit connected with the headset signal transmission end, a power supply connected with the headset center control unit, a headset amplifier unit connected with the headset center control unit, a headset sound reception unit connected with the headset center control unit, a headset DECT unit connected with the headset center control unit and accomplishes wireless data transmission to the base station and wireless data reception by the base station, and an identification unit connected with the headset center control unit and transmits an identification signal to the headset center control unit based on electronic connection between the headset signal transmission end and the handset signal transmission end.

3. The wireless telephone system with headset-handset assembly as in claim 2, characterized in that, the power supply of the headset is a rechargeable power supply which is connected with a headset power supply transmission end via a headset recharge circuit.

4. The wireless telephone system with headset-handset assembly as in claim 1, characterized in that, the handset hand-held receiver is provided with a handset center control unit connected with the handset signal transmission end, a handset power supply connected with the handset center control unit, a handset amplifier unit connected with the handset center control unit, and a handset sound reception unit connected with the handset center control unit.

5. The wireless telephone system with headset-handset assembly as in claim 4, characterized in that, the handset power supply is a rechargeable power supply which is connected with a first handset power supply transmission end via a handset recharge circuit; the base station is provided with a base station recharge circuit which is connected with a base station power supply and a base station power supply transmission end; the base station power supply transmission end is connected electronically with the first handset power supply transmission end when the handset hand-held receiver is connected with the base station.

6. The wireless telephone system with headset handset assembly as in claim 5, characterized in that, the handset recharge circuit is connected with a second handset power supply transmission end; the second handset power supply transmission end is connected electronically with the headset power supply transmission end when the handset hand-held receiver is connected with the headset.

7. The wireless telephone system with headset-handset assembly as in claim 1, characterized in that, the headset signal transmission end and the handset signal transmission end are PCM interfaces.

8. The wireless telephone system with headset-handset assembly as in claim 1, characterized in that, the handset hand-held receiver is provided with a headset recess to accommodate the headset; the base station is provided with a handset recess to accommodate the handset hand-held receiver.

9. The wireless telephone system with headset-handset assembly as in claim 1, characterized in that, the headset is provided with a headset operation key; the headset operation key is connected with a headset operation circuit; the headset operation circuit is connected with the headset center control unit.

10. The wireless telephone system with headset-handset assembly as in claim 1, characterized in that, the headset and the handset hand-held receiver are movably connected with each other via physical electronic connection.

* * * * *